3,038,810
FOOD COMPOSITION CONTAINING AN AUXILIARY ADDITIVE AND A FUNGISTAT
Jack Akerboom, Lincroft, and Daniel Melnick, Teaneck, N.J., and George A. Perry, Elmhurst, N.Y., assignors to Corn Products Company, New York, N.Y., a corporation of Delaware
No Drawing. Filed Aug. 18, 1959, Ser. No. 834,375
8 Claims. (Cl. 99—150)

This invention relates to novel compositions which are especially adapted as food flavor stabilizers and inhibitors of microbiological growth, as well as to food salads which can be stored for heretofore impossibly long periods of time without appreciable loss of flavor and without fear of creating a health hazard.

Sickness resulting from improperly handled food is not uncommon, particularly where there is inadequate food refrigeration or where the cook is ignorant of the basic sanitary concepts concerning food preparation, preservation and storage. The common household tests applied to foods in determining their edibility are appearance, odor and flavor.

Foods unintentionally contaminated with yeasts and molds are usually spotted and discarded based on their characteristic odor and appearance. Food poisoning bacteria such as for example certain types of Clostridium may produce a putrid odor and when this happens the food should be rejected. However, other food poisoning bacteria such as the Salmonella, Streptococcus and Staphylococcus can produce sickness when eaten, yet they may not be detected through the customary methods of organoleptic examination. Such is the case with potato salad, macaroni salad and other salads involving fish, meat and eggs. When sickness results from eating these foods, the mayonnaise dressing is frequently held to be the source of contamination. When mayonnaise dressing is properly made under sanitary conditions, there is sufficient acid, e.g. in the form of vinegar, and salt present in the aqueous phase to produce unfavorable conditions for the development of food poisoning bacteria. If the dressing is diluted and the acid present neutralized with nutrient material such as for example, potato, macaroni, fish, meat or eggs as in making a salad, the acid and salt in the dressing may no longer be present in protective concentrations and the salad is readily subject to spoilage through insanitary practices, poor or intermittent refrigeration and excessive shelf storage. Once the product has left the manufacturing center, the manufacturer has little control over the conditions under which the product is kept.

To illustrate present manufacturing practices for conventional "ready to eat" salads, attention is focused on the following commercial method for making refrigerated potato salad: The potatoes are washed and peeled by the use of conventional abrasive, lye or steam methods and then the eyes and blemishes are removed by hand. The potatoes are cooked whole to prevent excessive losses due to sloughing, fracturing or mashing in the cooking vat. Pre-peeled raw potatoes which have been dipped in a color preserving liquid may also be used, however, from an economic standpoint, it is usually desirable to do the peeling operation at the manufacturing center. The liquid used to prevent discoloration of raw potatoes for pre-peeled potatoes may consist of an aqueous solution of sodium bisulfite, citric, phosphoric and/or ascorbic acids. The whole potatoes are cooked until tender by autoclaving or at atmospheric pressure in either plain or salted water; they are then drained, and air cooled.

After cooling, the potatoes are sliced by hand or machine into the desired size, blended with the dressing and, if desired, chopped vegetable meats. The dressing consists of mayonnaise, salad dressing or combinations thereof with or without adder flavoring agents, sugar, salt and preserving agents against microbiological spoilage. The preserving agents consisting of sorbic or benzoic acid may be added to the dressing at a level of 0.1% by weight, on the dressing basis. Supplements of chopped vegetables, if used, may consist of onion, carrot, pepper and celery alone or in combinations thereof.

Macaroni salad, fish, meat or egg salads are prepared by adding the above described dressing thereto. The solid food components do not contain the preserving agent at the time of formulation.

Market distribution practices for the described salads demand constant refrigerated storage from the time of manufacture to the time of consumption to inhibit the growth of food poisoning organisms. At best the expectation is a shelf life encompassing no more than two weekends or a total of 11 to 12 days. Such demands restrict distribution to an area within a serviceable radius of the manufacturing center. In connection with microbiological growth, as few as 5 hours at room temperature is sufficient to allow bacteria to develop to such a degree in some foods as to induce food poisoning when eaten. Since it is impossible to guarantee that these products will always be kept under proper refrigeration, there exists a potential food poisoning hazard. Only when refrigeration is held just above the freezing point of the cooked food and guaranteed throughout the shelf life, it is possible to extend the shelf life of present salads to 28 days. However, at this time flavor deterioration has progressed to such a point that the product is no longer edible.

It is recognized that the original fresh flavor of salads, viz., potato salad, begins to deteriorate shortly after manufacture and this off-flavor becomes progressively more readily detectable, so that two weeks is usually the maximal period for acceptable flavor life. After four weeks' storage in the refrigerated state, the potato salad develops a stale, musty flavor that is very objectionable to the consumer. Certain risks and drawbacks are therefore associated with the prior art in making the refrigerated "ready to eat" salads for the retail trade. For this reason, no attempt has been made to manufacture such salads on a national scale for mass distribution.

Accordingly, an object of this invention is to provide a novel food additive which is effective in stabilizing food flavor and inhibiting microbiological growth.

Another object is to provide food salads which can be stored for appreciable periods of time without undue loss of flavor and without becoming a health hazard.

Other objects and advantages will become apparent from the following description and explanation of the invention.

In accordance with this invention, the novel food additive comprises about 0.0005 to 0.3% of a fungistat and about 0.0004 to 2% of an auxiliary additive selected from the group consisting of polycarboxylic acids, amino polycarboxylic acids, hydroxy acids, polyhydroxy compounds, polyphosphoric acids and their edible salts, and amino acids. More particularly, the food additive is used in cooked foods, such as food salads to preserve the food for long periods from the standpoint of flavor and microbiological growth.

The food additives are particularly effective in preserving vegetables or foods substantially free of fats, e.g. not more than 0.5% fat by weight. Such foods are characterized by having volatile and labile carbonyl compounds, e.g. aldehydes and ketones. In such foods carbonyls impart flavor. It is noted that fresh raw vegetables will remain highly acceptable for long periods, but once cooked, flavor deterioration takes place rapidly in spite of the fact that the enzymes are deactivated by cooking.

The preferred products of the present invention comprise a "ready to eat" refrigerated salad wherein not one component of the salad can in itself support the growth of food poisoning bacteria. Hence, when each of these components is subsequently blended to prepare the refrigerated salad, the salad itself will not support the growth of harmful bacteria. The preferred products of this invention may be kept for weeks at room temperature without fear of causing sickness when eaten. However, it is recommended that these products be kept under refrigeration to help maintain the flavor stability, and to inhibit the growth of microorganisms that might affect flavor and which are resistant to restricting influences of the fungistatic agent. The elimination of the potential food poisoning hazard is accomplished by treating each component of the salad with an acidifying agent in conjunction with a fungistatic agent in such a way that each component contains the acidifying agent and fungistat dispersed or dissolved therein at an effective level of concentration. An alternate method for manufacture of the "ready to eat" salads, involves incorporation into each of the components of the salad, other than dressing, sufficient concentration of the preserving agents to render these components incapable of supporting the growth of harmful bacteria; conventional dressings are then added to complete the salad. In this way, the more susceptible components of the salads are protected from the very first stages of process until incorporated into the finished product. The dressing itself, even though resistant to microbiological spoilage, will profit from migration of the preserving agents from the treated food components. It is desirable to add the preserving agents or food additives at a concentration of about 25 to 50% in excess when only the solid components of the salad are supplemented with the preserving agents.

The desirable acidifying agents are those which are edible, such as for example, acetic acid preferably in the form of vinegar, citric acid, lactic acid and phosphoric acid, however acetic acid is preferred. The edible acidifying agent is present in an amount to provide a pH of about 3 to 6.

The fungistatic or preserving agents incorporated into each component of the salad are organic free-carboxylic acids, their alkyl esters, where the alkyl radical contains 1 to 5 carbon atoms, such as the methyl, ethyl or propyl, etc., ester, and their edible alkali-metal and alkaline earth metal salts, such as the sodium, potassium, magnesium and calcium salts, respectively. Included among these carboxylic acids are the saturated lower aliphatic acids, including propionic and diacetic acids and the alpha-beta unsaturated carboxylic acids of the following formula:

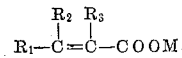

wherein that portion of the molecule containing the alpha-beta unsaturation may be either an aliphatic group or part of an aromatic ring. Where more than one unsaturated carbon to carbon linkage exists in the molecule, such unsaturation is part of a conjugated double bond system with alpha-beta carbon to carbon unsaturation. In the formula above, $R_1$ is hydrogen when $R_2$ and $R_3$ combine to complete a single carbocyclic nucleus; $R_1$ is a carbon atom or an aliphatic hydrocarbon group when $R_2$ and $R_3$ are hydrogen atoms or alkyl groups and M is selected from an edible metallic cation, hydrogen and an alkyl group containing 1 to 5 carbon atoms. Examples of such acids are: crotonic, isocrotonic, beta-ethylacrylic, dimethylacrylic, alpha-hexenoic, sorbic, benzoic and para-hydroxybenzoic acids, etc. The aliphatic compounds containing the alpha-beta unsaturation are preferred for this invention.

For the purpose of this specification and the appended claims, an organic carboxylic acid component includes generically the free acid, the alkyl ester and the soluble metal salts thereof, as limited hereinabove in regard to the alkyl group and the metallic cation.

Other compounds such as dehydroacetic acid and the dialkyl esters of alpha-beta dichlorosuccinic acid are also used as the fungistat. Dehydroacetic acid, otherwise known as 3-acetyl-6-methyl pyrandione-2,4, exists in both the keto and enolic form as the acid or as its sodium, potassium, ammonium and calcium salts. The dialkyl esters of alpha-beta dichlorosuccinic acid are those in which the alkyl groups each contain not more than 4 carbon atoms such as, for example, dimethyl, diethyl or methyl ethyl dichlorosuccinate.

The auxiliary additive is a compound selected from (a) amino polycarboxylic acids such as ethylenediaminetetrapropionic acid, propylenediaminetetraacetic acid, propylenediaminetetrapropionic acid, ethylenediaminediaceticdipropionic acid, N-hydroxyethyienediaminetriacetic diethylenetriaminepentaacetic acid, 1,2-diaminocyclohexanetetraacetic acid, nitrilotriacetic acid, N,N'-dibenzlethylenediaminediacetic acid, N-octadecylethylenediaminetriacetic acid, ethylenediaminediacetic acid, and the edible salts thereof. The salt forming radical is a metallic cation which is edible and includes sodium, potassium or calcium either alone or in combinations thereof, (b) polycarboxylic acids such as malonic, succinic or glutaric acid and the edible salts thereof, (c) hydroxy acids such as malic, lactic, citric, glycolic, or tartaric acids and the edible salts thereof, (d) polyhydroxy compounds such as catechol or inositol, (e) polyphosphoric acids such as sodium hexametaphosphate, sodium pyrophosphate, phytic acid and adenosine triphosphate, (f) amino acids such as aspartic, glutamic, cysteine, glycine or hydroxyethylglycine, (g) glucono-delta-lactone.

The action between the fungistat and the auxiliary additive is not clearly understood, except that the use of only one gives results which are significantly inferior to the conjoint use of the materials.

It was found that when the fungistat was used in combination with an auxiliary additive as such or as its soluble salts, an unexpected cooperation takes place in respect to prolonging the shelf life of cooked foods, particularly salads, from the standpoint of microbiological growth and flavor. Neither the fungistat nor the auxiliary additive alone produces such a result. The auxiliary additive is used in the cooked food in an amount of about 0.0004 to 2.0% by weight. The quantity of the fungistat present in the cooked food varies depending upon the fungistat used. For example, fungistats of the sorbic and dehydroacetic acid type are present in the cooked foods in amounts from about 0.015 to 0.3% by weight and preferably about 0.05 to 0.15% on the same basis, whereas fungistats of the dichlorosuccinic acid type, being effective at smaller concentrations, are present in the cooked foods in amounts from 0.0005 to 0.05%.

The material to which the preserving agents are added can be any cooked foodstuff which is susceptible to microbiological growth and undergoes flavor deterioration upon standing. The outstanding use of the invention is in regard to food salads, wherein the solid food component is, for example, macaroni, meat, fish, egg, potato, cabbage, and other vegetables, and the dressing is, for example, mayonnaise, salad dressing, French dressing, etc. It is understood by those skilled in the art that mayonnaise is the emulsified semi-solid food prepared from edible vegetable oil, an acidifying ingredient and an egg-yolk-containing ingredient. It usually contains from about 65% to about 80% vegetable oil, vinegar from about 0.15% to about 0.70% as acetic acid, and liquid egg-yolk from about 4% to about 10%. Flavoring additives including spices, salt and sugar may be also added. Salad dressing contains in addition to the components, listed above for mayonnaise, a cooked or partly cooked starchy paste. Salad dressing contains from about 30% to about 50% vegetable oil, vinegar from about 0.5% to about 2.0% as acetic acid, and liquid egg-yolk from about 4% to about 7%. Flavoring agents including spices, salt and sugar may be also added. French dressing is the separable liquid food or the emulsified viscous fluid food prepared from edible vegetable oil and an acidifying ingredient. It usually contains from about 35% to about 70% vegetable oil and vinegar from about 0.5% to about 2.0% as acetic acid. Flavoring agents including spices, salt and sugar may be also added. A strained tomato product may also be included. The emulsifying agent in French dressing is usually a vegetable gum and it is used in an amount of from about 0.15% to about 0.75%. The above described dressings can be stored for long periods of time, e.g. about 3–5 months at room temperature, but when used as a component of a food salad, the entire salad has a short shelf life as discussed above.

The solid food component of the salad comprises about 15 to 95%, preferably about 50 to 85% of the salad, whereas the dressing constitutes about 5 to 85% preferably 15 to 50% of the same, on a weight basis.

In the preparation of the cooked foods, it is important that the fungistat and the auxiliary additive, when added, be distributed at the opportune time throughout the food at levels sufficiently high to be effective in preserving the same at the very outset. In the case of food salads, the problem is especially important, because if the additive is preferentially oil soluble and it is incorporated into the oil-containing dressing only, it may be difficult or impossible to obtain effective distribution by reliance upon migration. To obtain the desired concentration, the food is prepared with that aim in mind. For example, due to diffusion barriers in the form of cell walls, raw foods, such as potatoes, etc., are not penetrated by the additives to any significant extent, consequently, these foods cannot be protected to the extent of the present invention. By the present invention, the foodstuffs are cooked or prepared under conditions facilitating immediate dispersion or spreading of the additive throughout the food to the extent that the additive is present throughout the food at levels sufficiently high to be effective as a preservative. Food salads require special treatment, particularly in the case of potato salads in order that the additives become distributed properly. The method to be used in the case of food salads will be illustrated by reference to a potato salad preparation.

The preferred potato salad products of this invention may be made as follows: the potatoes are washed and peeled through the use of conventional equipment. If lye is used during the peeling operation, it is desirable to neutralize any excess lye adhering to the potato after peeling, with an acid wash. The potatoes are then diced or sliced into the desired final size thus insuring more complete penetration of the preserving agents therein. The subdivided potatoes are cooked in an aqueous solution containing an acidifying agent, a fungistatic agent, auxiliary aditive and salt. The potato pieces are then cooled, preferably in a liquid cooling medium containing the same additives to prevent leaching out of the protective additives, and finally drained. The dressing contains the acidifying, fungistatic agent and the auxiliary additive. If chopped vegetable meats are used, it is preferred that they originally be dehydrated so that during rehydration, the acidifying agent, fungistat and auxiliary additive can be readily absorbed from the reconstituting liquor. The prepared potatoes are then blended gently with the dressing and reconstituted vegetable meats. After the blending operation is complete, the product is packaged through the use of conventional packaging equipment.

The pH of the potatoes after cooking should be between 6.0 and 3.0, the lower limit being governed by the desired flavor. The preferred pH of the cooked potato is between 5.0 and 4.0. The potatoes after cooking should contain throughout, a fungistatic agent at a minimum level of 0.0005, but not greater than 0.5%. It is also preferred that the auxiliary additive be incorporated into the potato during the cooking operation in a quantity not less than 4 p.p.m. and not in excess of 4000 p.p.m. or 0.0004 to 0.4% by weight, based on the potato.

It is not sufficient to allow the raw potato, skinned and sectioned, to be immersed in a liquor containing the preserving agents described in this invention and depend on the migration of said preservatives at room or lower temperature for penetration into the potato. The potato must be cooked to a point where starch gelatinization and protein denaturation occurs with attendant rupture of cell walls before effective migration of the perserving agents into the potato can take place. To be effective, the preserving liquor must be in contact with the potato section during and/or after the cooking operation.

The potatoes may be air cooled after the cooking operation is complete. However, there is a tendency for the surface dehydration of the potato to cause subsequently dehydration of the added dressing component. It is therefore preferred to cool the potatoes in a liquid containing the food additives in a concentration which is equivalent to that in the cooked potato so as to prevent the reverse migration of the preserving agent into the cooling medium.

The cooking operation may be done under elevated pressures or at atmospheric pressure, the potatoes being preferably immersed in an equal weight of the preserving liquor. The preserving liquid should contain the following components in an aqueous solution or dispersion in such a concentration that after equilibrium takes place between the cooking liquor and the potato, the potato should contain at least 0.05% but not more than 3.0% of acidifying agent, e.g. acetic acid derived from vinegar, and preferably 0.2%; at least 0.0005% but not more than 0.5% of a fungistatic agent, for example, sorbic acid; at least 0.1% but not more than 3.0% of common table salt and preferably 1.0%; and finally at least 4 p.p.m. and not more than 20,000 p.p.m. or 0.0004 to 2%, and preferably 40 to 4000 p.p.m. or 0.004 to 0.4% of the auxiliary additive as such or its equivalent in the form of a soluble salt. In view of the small quantity of the most effective auxiliary additive required and the unknown manner in which such an auxiliary additive coacts with the fungistat, the presence thereof in cooked foods may defy analysis. However, the improvement effected by the use of such additive indicates its presence in foods. The cooking liquor may be discarded after each batch or it may be reused after replenishment of the food additives that had migrated into the potato. Variations in the cooking operation may be made such as for example: Cooking the potato sections in the preserving liquor at elevated pressures; parboiling in water followed by additional cooking in the preserving liquor; or cooking in water until tender followed by cooling and pickling in the preserving liquor.

The potatoes after cooking are preferably cooled in a liquid medium. The potatoes may be cooled in the cooking liquor through the use of an appropriate heat exchanger or they may be drained and immersed in a prechilled cooling liquor which contains dissolved or dispersed therein the preserving agents at the same concentration as in the potatoes.

The dressing for the salad may consist of mayonnaise, salad dressing, French dressing, any combination of oil and vinegar, and combinations thereof with or without added sugar, salt and other flavor components, The preferred dressings contain an edible acidifying agent such as for example acetic acid in the form of vinegar at a concentration about equal to that contained in the cooked potato sections of this invention but less than 3.0% and common table salt at a level about equal to that found in the cooked potato but less than 3.0%. The dressing also contains a fungistatic agent such as for example sorbic acid, at a level about equal to that found in the cooked potato but less than 0.5%; and with or without the auxiliary additive, at a concentration about equal to the concentration found in the potato but less than 4000 p.p.m. (0.4%). The object of maintaining the level of the additives in the preferred dressings about equal to their levels within the cooked potato in the preferred products of this invention is to minimize the migration of said agents from the cooked potato into the dressing. When the additives are present in smaller concentrations in the dressing in relation to the solid food components, or even not at all in the less preferred products of this invention, then it is essential that sufficiently high concentrations of these additives be initially in the solid food components to yield concentrations within limits previously specified following migration into the dressing.

Chopped vegetables may be added as optional ingredients to the salad. Blanched dehydrated vegetables are preferred not only because of their ease of handling and storage but during the reconstitution process, the meats are readily rehydrated in an aqueous solution containing an edible acidifying agent in conjunction with an edible fungistatic agent, with or without the auxiliary agent. The reconstituted vegetables with additives in the proper concentration range therefore would be in equilibrium with the other components of the salad and therefore would minimize migration tendencies toward changes in concentration. The dehydrated vegetables would not constitute a source of enzymic reactions or contribute undesirable microorganisms. Fresh vegetables may be used as less preferred ingredients provided they are pasteurized and enzyme inactivated through proper heat treatment. The fungistatic agent and the auxiliary agent may be added during or after the pasteurization.

The examples given hereinafter serve to illustrate methods of practicing the present invention, it being understood, however, that the conditions set forth in the following examples are used as illustrations for a fuller understanding thereof and that no undue limitations or restrictions are to be imposed by reason thereof.

EXAMPLE I

*Potato Salad*

| Ingredient: | Parts by weight |
|---|---|
| Potato component—Diced cooked potatoes | 75.0 |
| Dressing component— | |
|     Mayonnaise | 16.00 |
|     Sugar | 1.80 |
|     Salt | 0.13 |
|     Spices | 0.75 |
|     Sorbic acid | 0.019 |
|     Ethylenediaminetetrapropionic acid | 0.001 |
|     Total | 18.700 |
| Vegetable component (rehydrated basis)— | |
|     Celery | 1.2 |
|     Red and green sweet peppers | 1.9 |
|     Onion | 3.2 |
|     Total | 6.3 |
| Grand total | 100.00 |

The potatoes were prepared as follows: The whole potatoes were washed and peeled by a conventional abrasive peeler after which the eyes and blemishes were removed by hand. Dicing to a ½″ cube was accomplished through the use of a conventional vegetable dicer. The cubes were then rinsed and weighed into a stainless steel perforated basket and immersed into a kettle containing an equal weight of boiling liquor of the following composition.

| Cooking liquor: | Parts by weight |
|---|---|
| Water | 93.78 |
| Vinegar (100 gr. spirit) | 4.00 |
| Salt | 2.00 |
| Sorbic acid | 0.20 |
| Ethylenediaminetetrapropionic acid | 0.02 |
| Total | 100.00 |

After boiling is resumed, the potato cubes were cooked for about 25 minutes or until tender. The basket containing the potatoes was then removed, drained and immersed in a second kettle containing an equal weight of continuously chilled cooling liquor of the following composition.

| Cooling liquor: | Parts by weight |
|---|---|
| Water | 96.89 |
| Vinegar (100 gr. spirit) | 2.00 |
| Salt | 1.00 |
| Sorbic acid | 0.10 |
| Ethylenediaminetetrapropionic acid | 0.01 |
| Total | 100.00 |

After the potato cubes were cooled to 90° F., the basket containing the potato was removed, drained and emptied into a blending kettle.

On a continuous manufacturing basis, the remaining cooking and cooling liquors are replenished with the various components to bring them back to the concentrations indicated above.

The dressing component was prepared by blending the mayonnaise with the sugar, salt, spices and the desired additives.

The dehydrated vegetable meats were reconstituted for a period of 6 hours in the refrigerator in a liquor, the composition of which was the same as that of the potato cooling liquor. Ten parts of reconstitution liquor were used per one part of the vegetable meats. The vegetables were drained after reconstitution was complete. The dressing, vegetable meats and potatoes were combined, blended and filled into containers through the use of conventional packaging equipment and the salad refrigerated at 40° F.

EXAMPLE II

The composition and process of Example I except 1 part of dehydroacetic acid is substituted for 1 part of sorbic acid.

EXAMPLE III

The composition of Example I wherein 0.05 part of dimethyl dichlorosuccinate are substituted for 1 part of sorbic acid. The potato salad is prepared as described in Example I except that the potatoes are cooked for 10 minutes in a pressure cooker at 15 pounds pressure thus preventing loss of the fungistat due to its volatility.

EXAMPLE IV

The composition and process of Example I except that 1 part of benzoic acid is substituted for 1 part of sorbic acid.

EXAMPLE V

The composition and process of Example I except that 0.5 part of the auxiliary additive propylenediaminetetraacetic acid are substituted for 1 part of ethylenediaminetetrapropionic acid.

EXAMPLE VI

The composition and process of Example II except that 1.0 part of the auxiliary additive propylenediaminetetrapropionic acid are substituted for 1 part of ethylenediaminetetrapropionic acid.

EXAMPLE VII

The composition and process of Example I except that 0.75 part of the auxiliary additive ethylenediaminediaceticdipropionic acid are substituted for 1 part of ethylenediaminetetrapropionic acid.

EXAMPLE VIII

The composition and process of Example III except that 1.0 part of the auxiliary additive N-hydroxyethylenediaminetriacetic acid are substituted for 1 part of ethylenediaminetetrapropionic acid.

EXAMPLE IX

The composition and process of Example IV except that 1.0 part of the auxiliary additive diethylenetriaminepentaacetic acid are substituted for 1 part of ethylenediaminetetrapropionic acid.

EXAMPLE X

The composition and process of Example III except that 1.0 part of the auxiliary additive 1,2-diaminocyclohexanetetraacetic acid are substituted for 1 part of ethylenediaminetetrapropionic acid.

EXAMPLE XI

The composition and process of Example II except that 1.2 parts of the auxiliary additive nitrilotriacetic acid are substituted for 1 part of ethylenediaminetetrapropionic acid.

EXAMPLE XII

The composition and process of Example I except that 0.6 part of the auxiliary additive N,N'-dibenzylethylenediaminediacetic acid are substituted for 1 part of ethylenediaminetetrapropionic acid.

EXAMPLE XIII

The composition and process of Example IV except that 1.2 parts of the auxiliary additive N-octadecylethylenediaminetriacetic acid are substituted for 1 part of ethylenediaminetetrapropionic acid.

EXAMPLE XIV

The composition and process of Example II except that 1.0 part of the auxiliary additive ethylenediaminediacetic acid are substituted for 1 part of ethylenediaminetetrapropionic acid.

EXAMPLE XV

The composition and process of Example I except that 10 parts of the auxiliary additive malonic acid are substituted for 1 part of ethylenediaminetetrapropionic acid.

EXAMPLE XVI

The composition and process of Example IV except that 20 parts of the auxiliary additive succinic acid are substituted for 1 part of ethylenediaminetetrapropionic acid.

EXAMPLE XVII

The composition and process of Example II except that 15 parts of the auxiliary additive glutaric acid are substituted for 1 part of ethylenediaminetetrapropionic acid.

EXAMPLE XVIII

The composition and process of Example I except that 10 parts of the auxiliary additive malic acid are substituted for 1 part of ethylenediaminetetrapropionic acid.

EXAMPLE XIX

The composition and process of Example II except that 10 parts of the auxiliary additive lactic acid are substituted for 1 part of ethylenediaminetetrapropionic acid.

EXAMPLE XX

The composition and process of Example IV except that 10 parts of the auxiliary additive citric acid are substituted for 1 part of ethylenediaminetetrapropionic acid.

EXAMPLE XXI

The composition and process of Example II except that 10 parts of the auxiliary additive glycolic acid are substituted for 1 part of ethylenediaminetetrapropionic acid.

EXAMPLE XXII

The composition and process of Example II except that 10 parts of the auxiliary additive tartaric acid are substituted for 1 part of ethylenediaminetetrapropionic acid.

EXAMPLE XXIII

The composition and process of Example I except that 15 parts of the auxiliary additive catechol are substituted for 1 part of ethylenediaminetetrapropionic acid.

EXAMPLE XXIV

The composition and process of Example I except that 10 parts of the auxiliary additive inositol are substituted for 1 part of ethylenediaminetetrapropionic acid.

EXAMPLE XXV

The composition and process of Example IV except that 20 parts of the auxiliary additive sodium hexametaphosphate are substituted for 1 part of ethylenediaminetetrapropionic acid.

EXAMPLE XXVI

The composition and process of Example I except that 20 parts of the auxiliary additive sodium pyrophosphate are substituted for 1 part of ethylenediaminetetrapropionic acid.

EXAMPLE XXVII

The composition and process of Example I except that 10 parts of the auxiliary additive phytic acid are substituted for 1 part of ethylenediaminetetrapropionic acid.

EXAMPLE XXVIII

The composition and process of Example I except that 10 parts of the auxiliary additive adenosine triphosphate are substituted for 1 part of ethylenediaminetetrapropionic acid.

EXAMPLE XXIX

The composition and process of Example I except that 20 parts of the auxiliary additive aspartic acid are substituted for 1 part of ethylenediaminetetrapropionic acid.

EXAMPLE XXX

The composition and process of Example IV except that 20 parts of the auxiliary additive glutamic acid are substituted for 1 part of ethylenediaminetetrapropionic acid.

EXAMPLE XXXI

The composition and process of Example I except that 20 parts of the auxiliary additive cysteine are substituted for 1 part of ethylenediaminetetrapropionic acid.

EXAMPLE XXXII

The composition and process of Example I except that 20 parts of the auxiliary additive glycine are substituted for 1 part of ethylenediaminetetrapropionic acid.

EXAMPLE XXXIII

The composition and process of Example I except that 10 parts of the auxiliary additive hydroxyethylglycine are substituted for 1 part of ethylenediaminetetrapropionic acid.

EXAMPLE XXXIV

The composition and process of Example I except that 10 parts of the auxiliary additive glucono-delta-lactone are substituted for 1 part of ethylenediaminetetrapropionic acid.

The results obtained in evaluating the products of the present invention in relation to the products of the prior art, including extensions of the prior art, are given in Table 1. It is obvious that the compositions and processes of the present invention permit (1) the manufacture of a salad which is safe for extended periods from food poisoning hazards and spoilage due to microbiological activity, and (2) the manufacture of a salad which is remarkably resistant to the development of off flavors.

TABLE I

*Evaluation of the Examples Given in Relation to Reference Control Products, All Stored at Refrigerator Temperatures*

| Identity of Food Salad [2] | Shelf life of product because of— | |
|---|---|---|
| | Microbiological Spoilage,[1] Weeks | Flavor Deterioration, Weeks |
| Reference A—Neither preserving agent nor auxiliary additive present. | 1 | 1. |
| Reference B—0.1% sorbic acid in dressing. | more than 16 | 1. |
| Reference C—0.5% sorbic acid in dressing. | 10 | 0.[3] |
| Example: | | |
| I | more than 16 | more than 16. |
| II | more than 16 | more than 16. |
| III | more than 16 | more than 16. |
| IV | more than 16 | more than 16. |
| V | more than 16 | more than 16. |
| VI | more than 16 | more than 16. |
| VII | more than 16 | more than 16. |
| VIII | more than 16 | more than 16. |
| IX | more than 16 | more than 16. |
| X | more than 16 | more than 16. |
| XI | more than 16 | more than 16. |
| XII | more than 16 | more than 16. |
| XIII | more than 16 | more than 16. |
| XIV | more than 16 | more than 16. |
| XV | more than 16 | 4½. |
| XVI | more than 16 | 5. |
| XVII | more than 16 | 4½. |
| XVIII | more than 16 | 4½. |
| XIX | more than 16 | 4½. |
| XX | more than 16 | 4½. |
| XXI | more than 16 | 4½. |
| XXII | more than 16 | 4½. |
| XXIII | more than 16 | 5. |
| XXIV | more than 16 | 4½. |
| XXV | more than 16 | 5. |
| XXVI | more than 16 | 5. |
| XXVII | more than 16 | 4½. |
| XXVIII | more than 16 | 4½. |
| XXIX | more than 16 | 5. |
| XXX | more than 16 | 5. |
| XXXI | more than 16 | 5. |
| XXXII | more than 16 | 5. |
| XXXIII | more than 16 | 4. |
| XXXIV | more than 16 | 4½. |

[1] Noted as gaseous fermentation in the product and/or excessively high bacterial counts.
[2] The control products associated with the above examples, involving the preparation of the examples as described but eliminating the auxiliary additive, gave food salads exhibiting freedom from microbiological spoilage over a period of more than 16 weeks but were unacceptable in flavor after a period of 1 week. The control products made exactly the same as the above examples but with the fungistat now omitted were unacceptable because of microbiological spoilage and flavor deterioration after a period of 1 week.
[3] Inedible because of the flavor of the preservative overpowering that of the dressing.

By chemical preservation of foods according to the process of this invention, a safe means for the mass feeding of populations in underdeveloped foreign countries becomes available. In these countries refrigeration is not available, and food poisoning is as common as food consumption itself. Food cooked according to a preferred process of the present invention, viz., with 0.10 percent sorbic acid dispersed uniformly through the solid and liquid components of the food and the pH of the food being about 4.5, will keep almost indefinitely without refrigeration. Since not all foods are palatable at this low pH value, restoration to the natural pH of the food or to the range of palatability is made by the individual just prior to consumption. This is accomplished by providing an edible alkalinizing agent in pill or powdered form in amounts just adequate for the acid neutralization to the range of palatability. In many foods, viz., soups and gruels, the presence of neutralized acetic acid is objectionable, still vinegar in character. In such cases, we prefer to use citric or phosphoric acid as the acidifying agent. The excess acid is neutralized just prior to consumption. For example, for every gram of citric acid added to the food in processing, two grams of trisodium phosphate are added prior to consumption. Reduction is made in the salt (sodium chloride) content of the processed food in anticipation of the saltiness created when the alkalinizing agent is added to neutralize the excess acidity of the processed stored food. In the case of foods which are not readily neutralized to a palatable pH just prior to consumption, i.e., foods other than soups and gruels, these are recooked by the consumer in a solution of the alkaline agent to affect neutralization. An alternate method would be to process the food with the sorbic acid at 0.2% concentration and without pH lowering, but depend upon the addition of an edible antibiotic, such as chlortetracycline, oxytetracycline, tetracycline, streptomycin, neomycin, mycostatin, aerosporin, ascosin, rimocidin, penicillin, subtilin, and chloromycetin, alone or in combinations in concentrations of 1 to 1000 p.p.m. (0.0001 to 0.1%). At the more neutral pH values, the antibiotics are effective against bacterial spoilage, while the sorbic acid is effective against mold and yeast spoilage.

Having thus given a written description of the invention along with specific examples, it should be understood that no undue limitations or restrictions are to be imposed by reason thereof, but that the scope of this invention is defined by the appended claims.

This application is a continuation-in-part application of our copending application Serial No. 670,663, filed July 9, 1957 (now abandoned).

We claim:

1. A composition comprising the combination of about 0.0004 to 2% of an auxiliary additive selected from the group consisting of propylenediaminetetraacetic acid, propylenediaminetetrapropionic acid, ethylenediaminediaceticdipropionic acid, ethylenediaminetetrapropionic acid, N-hydroxyethylenediaminetriacetic acid, diethylenetriaminepentaacetic acid, 1,2 diaminocyclohexanetetraacetic acid, nitrilotriacetic acid, N,N'-dibenzylethylenediaminediacetic acid, N-octadecylethylenediaminetriacetic acid and ethylenediaminediacetic acid, and about 0.0005 to 0.3% of a fungistat selected from the group consisting of sorbic acid, dehydroacetic acid, dimethyldichlorosuccinate and benzoic acid.

2. A composition according to claim 1 wherein said auxiliary additive is present in the amount of 0.004 to 0.4% and said fungistat is present in the amount of 0.05 to 0.15%.

3. A food salad comprising about 15 to 95% of a solid food component and about 5 to 85% of an edible dressing, said food salad comprising about 0.0004 to 2% of an auxiliary additive selected from the group consisting of propylenediaminetetraacetic acid, propylenediaminetetrapropionic acid, ethylenediaminetetrapropionic acid, ethylenediaminediaceticdipropionic acid, N-hydroxyethylenediaminetriacetic acid, diethylenetriaminepentaacetic acid, 1,2 diaminocyclohexanetetraacetic acid, nitrilotriacetic acid, N,N'-dibenzylethylenediaminediacetic acid, N-octadecylethylenediaminetriacetic acid, and ethylenediaminediacetic acid, and about .0005 to 0.3% by weight of an edible fungistat selected from the group consisting of sorbic acid, benzoic acid, dehydroacetic acid and dimethyldichlorosuccinate, the pH of the salad being less than 6.

4. A composition comprising the combination of about 0.0004 to about 2% of an auxiliary additive selected from the group consisting of malonic acid, succinic acid, glutaric acid, malic acid, lactic acid, citric acid, glycolic acid, tartaric acid, catechol, inositol, sodium hexametaphosphate, sodium pyrophosphate, phytic acid, adenosine triphosphate, and glucono-delta-lactone and about 0.015 to about 0.3% of a fungistat selected from the group consisting of dehydroacetic acid, sorbic acid, dimethyldichlorosuccinate and benzoic acid.

5. A composition according to claim 4 wherein said auxiliary additive is present in the amount of about 0.004 to about 0.4% and said fungistat is present in the amount of about 0.05 to about 0.15%.

6. A food salad comprising about 15 to 95% of a solid food component, said food salad comprising about 0.0004 to 2% of an auxiliary additive selected from the group consisting of propylenediaminetetraacetic acid, propylenediaminetetrapropionic acid, ethylenediaminetetrapropionic acid, ethylenediaminediaceticdipropionic acid, N-hydroxyethylenediaminetriacetic acid, diethylenetriaminepentaacetic acid, 1,2 diaminocyclohexanetetraacetic acid, nitrilotriacetic acid, N,N'-dibenzylethylenediaminediacetic acid, N-octadecylethylenediaminetriacetic acid, and ethylenediaminediacetic acid, and about .0005 to 0.3% by weight of an edible fungistat selected from the group consisting of sorbic acid, benzoic acid, dehydroacetic acid and dimethyldichlorosuccinate, and about 5 to 85% of an edible dressing, said dressing containing evenly distributed therethrough about 0.0005 to 0.3% of an edible fungistat selected from the group consisting of sorbic acid, benzoic acid, dehydroacetic acid and dimethyldichlorosuccinate, the pH of said salad being less than 6.

7. A food salad comprising about 15 to 95% of a solid food component and about 5 to 85% of an edible dressing, said food salad comprising about 0.0004 to 2% of an auxiliary additive selected from the group consisting of malonic acid, succinic acid, glutaric acid, malic acid, lactic acid, citric acid, glyolic acid, tartaric acid, catechol, inositol, sodium hexametaphosphate, sodium pyrophosphate, phytic acid, adenosine triphosphate, and glucono-delta-lactone, and about 0.05 to 0.3% by weight of an edible fungistat selected from the group consisting of sorbic acid, benzoic acid, dehydroacetic acid and dimethyldichlorosuccinate, the pH of the salad being less than 6.

8. A food salad comprising about 15 to 95% of a solid food component, said food salad comprising about 0.0004 to 2% of an auxiliary additive selected from the group consisting of malonic acid, succinic acid, glutaric acid, malic acid, lactic acid, citric acid, glycolic acid, tartaric acid, catechol, inositol, sodium hexametaphosphate, sodium pyrophosphate, phytic acid, adenosine triphosphate, and glucono-delta-lactone, and about 0.05 to 0.3% by weight of an edible fungistat selected from the group consisting of sorbic acid, benzoic acid, dehydroacetic acid and dimethyldichlorosuccinate, and about 5 to 85% of an edible dressing, said dressing containing evenly distributed therethrough about 0.05 to 0.3% of an edible fungistat selected from the group consisting of sorbic acid, benzoic acid, dehydroacetic acid and dimethyldichlorosuccinate, the pH of said salad being less than 6.

References Cited in the file of this patent

UNITED STATES PATENTS

| | | |
|---|---|---|
| 2,379,294 | Gooding | June 26, 1945 |
| 2,518,233 | Hall | Aug. 8, 1950 |
| 2,563,835 | Gribbins et al. | Aug. 14, 1951 |
| 2,607,745 | Magoffin | Aug. 19, 1952 |
| 2,610,973 | Evans et al. | Sept. 16, 1952 |
| 2,707,154 | Lehmann et al. | Apr. 26, 1955 |
| 2,722,483 | Winkler | Nov. 1, 1955 |
| 2,732,386 | Kuhrt | Jan. 24, 1956 |